Figure 1:
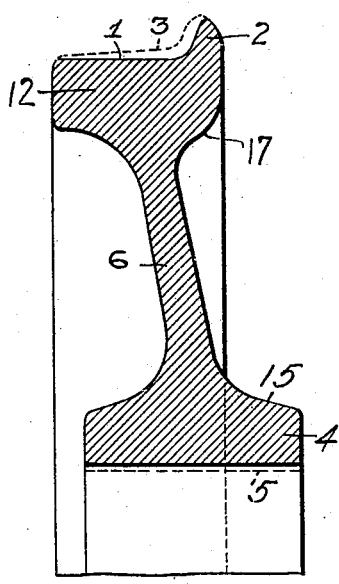

J. M. HANSEN.
METHOD OF REWORKING CAR WHEELS.
APPLICATION FILED DEC. 18, 1908. RENEWED JAN. 27, 1910.

969,275.

Patented Sept. 6, 1910.

2 SHEETS—SHEET 1.

WITNESSES.
J. R. Keller
Robert C. Totten

INVENTOR.
John M. Hansen
By Kay & Totten
attorneys

THE NORRIS PETERS CO., WASHINGTON, D. C.

J. M. HANSEN.
METHOD OF REWORKING CAR WHEELS.
APPLICATION FILED DEC. 18, 1908. RENEWED JAN. 27, 1910.

969,275.

Patented Sept. 6, 1910.

2 SHEETS—SHEET 2.

WITNESSES.

INVENTOR.

UNITED STATES PATENT OFFICE.

JOHN M. HANSEN, OF PITTSBURG, PENNSYLVANIA.

METHOD OF REWORKING CAR-WHEELS.

969,275. Specification of Letters Patent. Patented Sept. 6, 1910.

Application filed December 18, 1908, Serial No. 468,148. Renewed January 27, 1910. Serial No. 540,468.

*To all whom it may concern:*

Be it known that I, JOHN M. HANSEN, a resident of Pittsburg, in the county of Allegheny and State of Pennsylvania, have invented a new and useful Improvement in Methods of Reworking Car-Wheels; and I do hereby declare the following to be a full, clear, and exact description thereof.

My invention relates to the re-working of car wheels, its object being to restore the wheels practically to their original condition after they are worn.

It is an improvement upon the method described by me in an application filed June 13, 1908, Serial No. 438,421. These steel car wheels are subjected to severe wear on their tread and flange portions and after they are worn down so as to either change the level of car, or become unsafe such as through the thinning of the flange or the throat uniting the tread and flange, it is important to restore them to their original gage of tread and thickness of flange so as to increase their life and wear. In said application filed as above I accomplish this result by providing in the new wheel an excess of metal in its rim portion above that required for the work for which the wheel is intended and when the wheel is worn, heating the same and reforging it so as to restore the rim and flange to their original size of tread and thickness of flange by forging the rim portion outwardly or radially, and forging the hub portion inwardly to decrease the size of the axle eye and permit it to be re-bored to fit the standard size of axle.

The special object of the present invention is to so forge the wheel rim and hub as to prevent the buckling or deformation of the web portion of the wheel; and it consists, generally stated, in reheating the wheel and supporting it on a die conforming to the cylindrical enlargement or enlargements of the wheel body and forging such enlargement or enlargements radially when so supported, so as to force the rim portion outwardly and restore it to its full diameter or force the hub portion inwardly to reduce the eye.

It also consists in inverting the heated wheel after such forging operation and supporting it upon another die conforming in like manner to the reforged face or body of the wheel and again forging the enlargement or enlargements radially to complete the forging operation.

Figure 2:
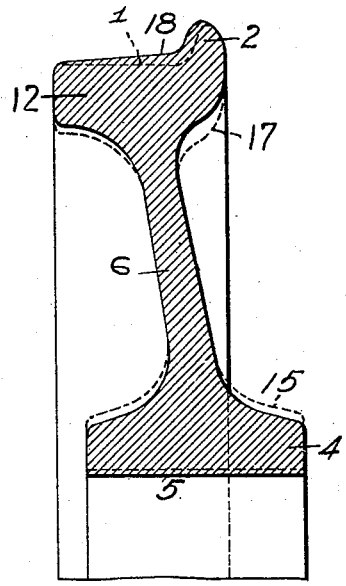
Figure 3:
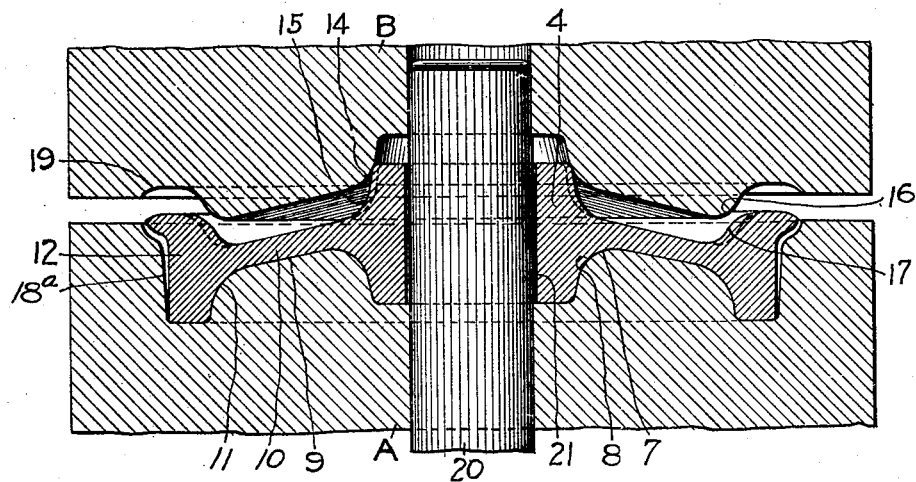
Figure 4:
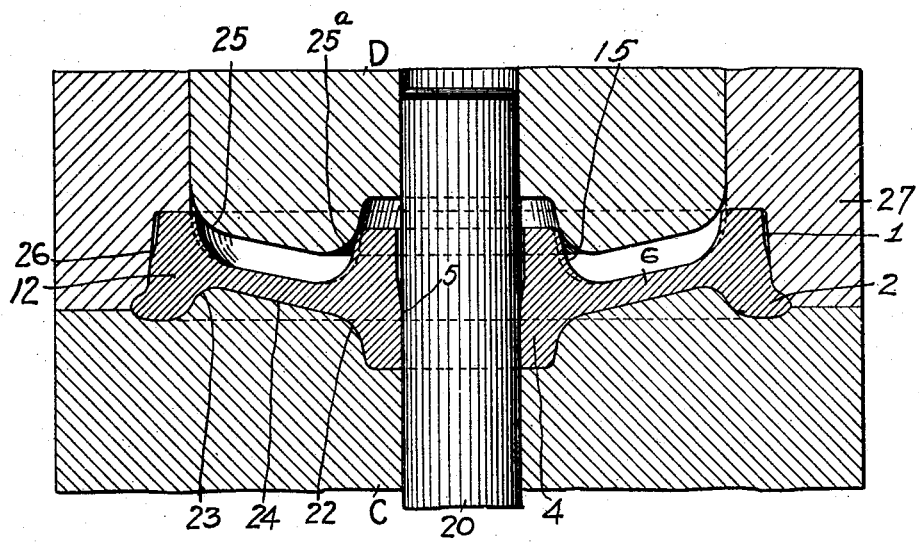
Figure 5:
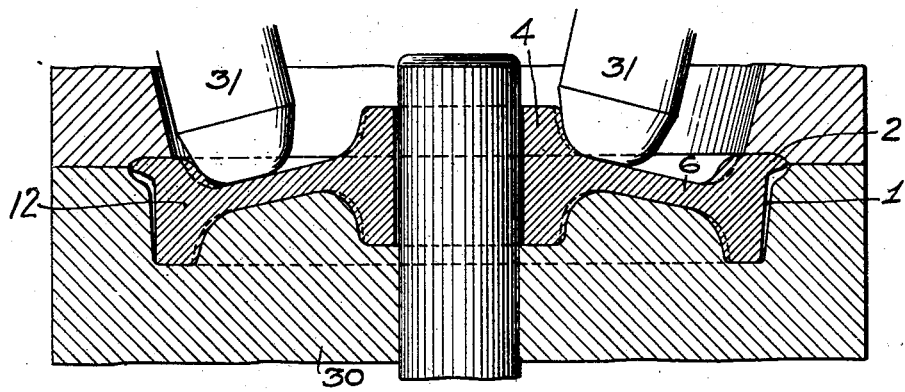

In the accompanying drawings Figure 1 is a sectional view of a portion of the wheel after the wear thereof, illustrating by dotted lines the portion worn from the rim of the wheel and the enlargement of the axle eye; Fig. 2 is a view of the wheel after the re-forging of the same according to the present invention, illustrating by dotted lines the result of such forging operation; Fig. 3 is a view of the dies employed for the first forging step; Fig. 4 is a like view of the dies employed for the second forging step, said figures illustrating the lines of forging by dotted lines; Fig. 5 is a view illustrating the forging portion where the blank is supported on a die and the forging thereof is performed by means of rolls.

My invention may be employed in connection with any form of forged wheel. It is illustrated in connection with the standard steel railroad wheel, produced either by rolling or die forging, the wheel having a sufficient body of metal to provide a wheel of proper strength after the re-forging operation. The wheel in use while it wears over its entire tread and the inner face of its flange, usually wears to greater extent in the portion of the tread near the flange and on the inner face of the flange, such portions being known as the neck or throat of the wheel. For example, Fig. 1 shows the worn wheel in full lines, indicating the face of the rim portion 1 with its flange 2, while the amount of wear on the tread is illustrated by the dotted lines 3. After the wheel has worn it must be driven from the axle and such operation enlarges the axle eye, the hub portion being shown at 4 while the dotted line 5 indicates the original size of the wheel before placed on the axle. Of course these lines are not made to scale, being simply employed to indicate the requirements on account of the wear and use of the wheel. By my invention I am enabled both to bring the wheel back to its original diameter or size of tread and flange, and also to decrease the size of the axle eye so that it can again be re-bored to give the proper size of axle eye to fit the standard axle or one of the same diameter as that from which it was removed, and I accomplish this while protecting the web or spoke portion 6 of the wheel from injury either by buckling or stretching or other deformation. I prefer of course to operate upon both the hub portion 4 and the rim portion 1 of the wheel at the same time and also to operate with forging dies and will describe the invention accordingly.

The lower supporting die A for the first forging operation conforms to one face of the wheel, for example having the curved face 7 fitting the inner face 8 of the hub portion 4, the inclined face 9 fitting the web or spoke portion 10 and the curved face 11 fitting the inner face of the rim portion 12. The upper die B has working faces acting to forge the enlargements of the wheel body radially such as the forging face 14 acting on the outer face 15 of the hub 4 and the forging face 16 acting on the inner face 17 of the rim, while conforming in shape to the web or spoke portion 6. Under the forging stroke of this die B while the wheel body is fully supported upon the die A which fits into its irregularities of shape, the hub is forced radially inwardly and the rim is forced radially outwardly, so acting to partially or wholly bring the tread and flange back to their original shape, filling out the face thereof to the line 15, as shown in Fig. 2. In some cases the wheel needs only this one forging stroke, in which case the lower die A has the tread forming face 18ª, the upper die having either formed with it, as in Fig. 3, or separately as in Fig. 4, the face 19, while a suitable mandrel 20 within the eye 21 of the wheel body sustains the same under the compressing stroke of the forging dies, permitting the metal under said stroke to flow so as to reduce the diameter of the eye as above stated. For certain wheels, however, I find it desirable to employ two forging strokes and after the heating of the wheel and subjection of the same to the dies of Fig. 3 I prefer to invert the wheel, placing the same upon a set of dies conforming in shape to and supporting the re-forged face of such wheel and then subjecting the wheel to a second forging step to complete the spreading of the rim and contracting of the hub and to compress the tread and flange faces, as illustrated in Fig. 4. In such case the supporting die C has the curved faces 22, 23, conforming in shape to the re-forged outer face of the hub and inner face of the rim, and the inclined face 24 conforming to the face of the web, and the upper die D has the forging face 25 acting to spread or force the rim portion outwardly and the forging face 25ª acting to force the hub portion inwardly. In connection with such forging stroke I provide one or the other die with the flange and tread forming faces 26 and to bring heavy pressure upon the tread and flange faces I prefer to employ the ring die 27 operating upon the rim portion of the wheel body and bringing the heavy pressure as above stated upon the tread and flange to compact and harden the same. Where the wheel body is subjected to the two compressing strokes, as above stated, it is necessary only to provide the forming mandrel in connection with the last compressing stroke, and it may enter the eye either before or during the compressing stroke as found most desirable.

Where the invention is employed in connection with a roll forging operation I employ the supporting die 30 conforming to the hub, web and rim of the wheel, as illustrated, and so supporting the blank while the roller die 31 operates upon the opposite face of the blank and may act both upon the rim and hub to forge the same laterally or radially as above stated.

It is evident from the above description that I am enabled by the present invention to properly support the web or spoke portion of the wheel, holding it to the desired shape and at the same time to re-forge both the rim and the hub providing by one or two forging operations and by the radial forging of the rim portion to re-form the tread and flange of the wheel, utilizing the surplus metal in the rim portion to fill out and build up the working faces of the tread and flange to full size and bring the flange to full thickness, and to properly compact and compress the same, and also to so forge the hub as to reduce the size of the axle eye sufficiently to permit of the re-boring of the same and the fitting of the wheel upon the standard axle or an axle of the same diameter as that from which it was removed. In such operations any surplus metal may of course pass between the dies and the flash or fin may be removed by turning. I am thus enabled to restore the wheel to its full diameter, and to thicken up the throat and flange thereof at an operating cost much less than the cost of manufacturing new wheels, so that the life of the car wheel is at least doubled; and if the wheel has sufficient excess of metal it may be reforged in this way several times, causing a great saving in the relative cost of such forged wheels.

What I claim is:

1. The method of re-forging car wheels, consisting in reheating the wheel and supporting it on a die conforming to a cylindrical enlargement on one face of the wheel body and forging a cylindrical enlargement on the opposite face thereof radially when the wheel is so supported.

2. The method of re-forging car wheels, consisting in reheating the wheel and supporting it on a die conforming to a portion of a cylindrical enlargement of the wheel body, and forging another portion of such enlargement radially when the wheel is so supported.

3. The method of re-forging car wheels, consisting in reheating the wheel, supporting it on a die conforming to the inner face of the wheel rim on one side thereof, and forging the opposite side of such rim portion outwardly when the wheel is so supported.

4. The method of re-forging car wheels, consisting in reheating the wheel, supporting it on a die conforming to the outer face of the hub portion on one side of the wheel, and forging the opposite portion of the hub inwardly when the wheel is so supported.

5. The method of re-forging car wheels, consisting in reheating the wheel and supporting it on a die conforming to one face of the hub, web and rim, and forging the opposite hub and rim portions radially when the wheel is so supported.

6. The method of re-forging car wheels, consisting in reheating the wheel, supporting it on a die conforming to one face of a cylindrical enlargement of the wheel body and forging the opposite portion of such enlargement radially, inverting the wheel and supporting such re-forged portion thereof on a die conforming thereto, and forging the opposite portion of such enlargement radially.

7. The method of re-forging car wheels, consisting in reheating the wheel, supporting it on a die conforming to one portion of the wheel hub, and forging the opposite portion of said hub inwardly against a central supporting mandrel.

In testimony whereof, I the said JOHN M. HANSEN have hereunto set my hand.

JOHN M. HANSEN.

Witnesses:
ROBERT C. TOTTEN,
J. R. KELLER.